United States Patent [19]

Duvoisin et al.

[11] 4,252,384
[45] Feb. 24, 1981

[54] CYCLE CRANK GEAR ASSEMBLY INCLUDING REPLACEABLE CARTRIDGE

[75] Inventors: Michel Duvoisin, Motiers; Charles Berthoud, Couvet, both of Switzerland

[73] Assignee: Edouard Dubied & Cie SA, Switzerland

[21] Appl. No.: 72,413

[22] Filed: Sep. 4, 1979

[30] Foreign Application Priority Data

Sep. 13, 1978 [CH] Switzerland ................. 9582/78

[51] Int. Cl.³ ............................................. F16C 9/02
[52] U.S. Cl. ........................... 308/23.5; 308/179.5; 308/236; 308/62
[58] Field of Search .............. 308/23.5, 179.5, 236, 308/62, 187.1, 36.1, 23, 179

[56] References Cited

U.S. PATENT DOCUMENTS

| | | | |
|---|---|---|---|
| 3,578,829 | 5/1971 | Hata et al. | 308/179.5 |
| 3,832,024 | 8/1974 | Nishikawa | 308/236 |
| 3,903,754 | 9/1975 | Morroni | 308/179.5 |
| 4,164,063 | 8/1979 | Cenko et al. | 308/236 |

*Primary Examiner*—Lenard A. Footland
*Attorney, Agent, or Firm*—Lewis H. Eslinger

[57] ABSTRACT

A cycle crank gear assembly includes a weather sealed, preadjusted cartridge which is replaceably installed in a crank gear box in a cycle frame. A clamping or wedging device secures the cartridge in the crank gear box.

4 Claims, 6 Drawing Figures

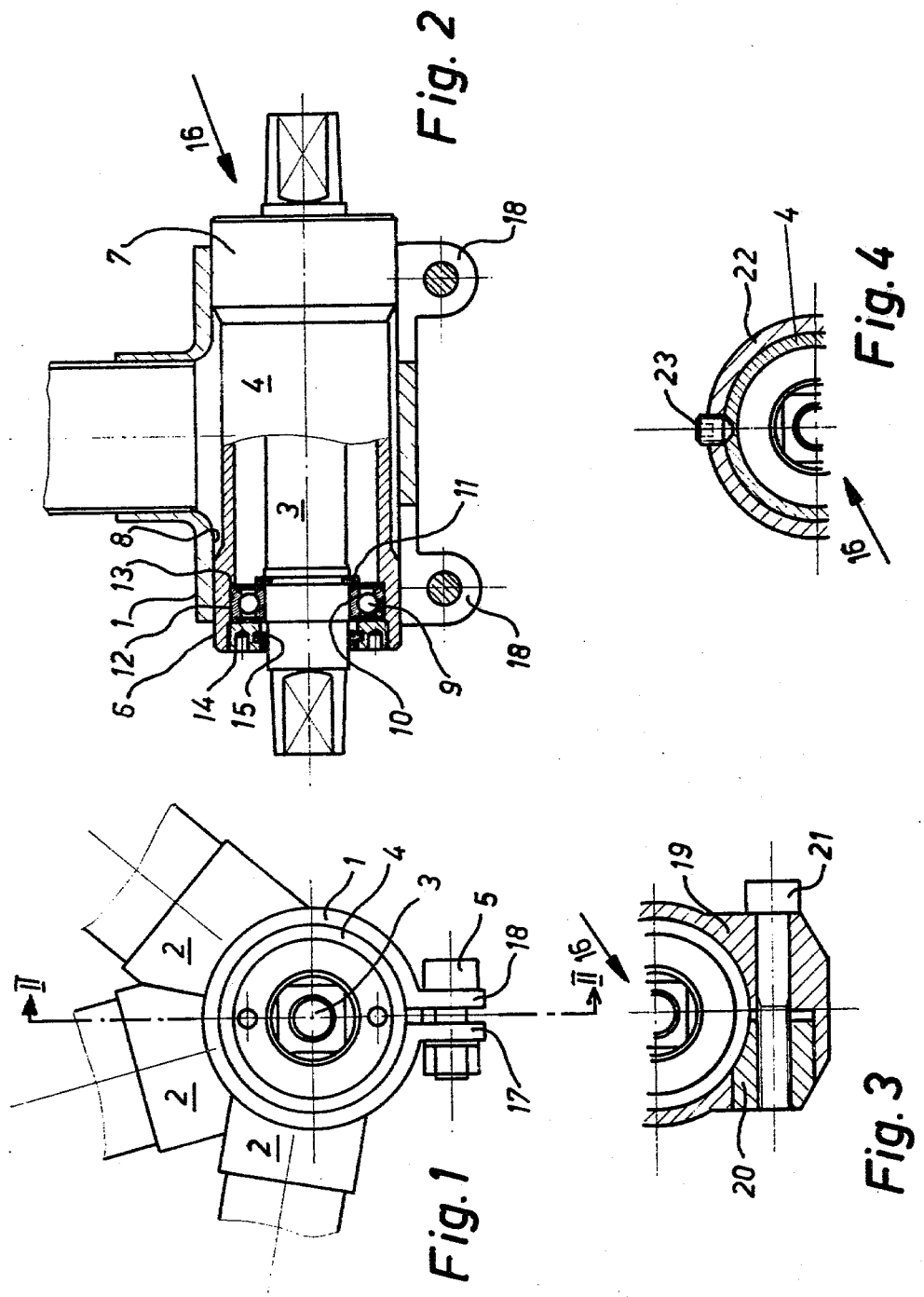

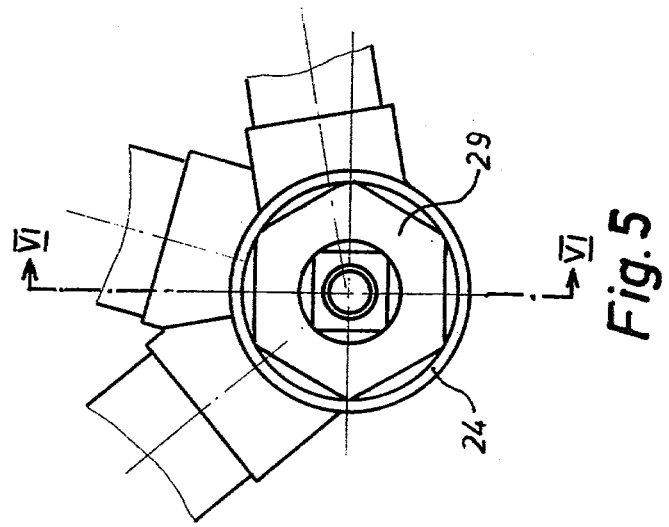
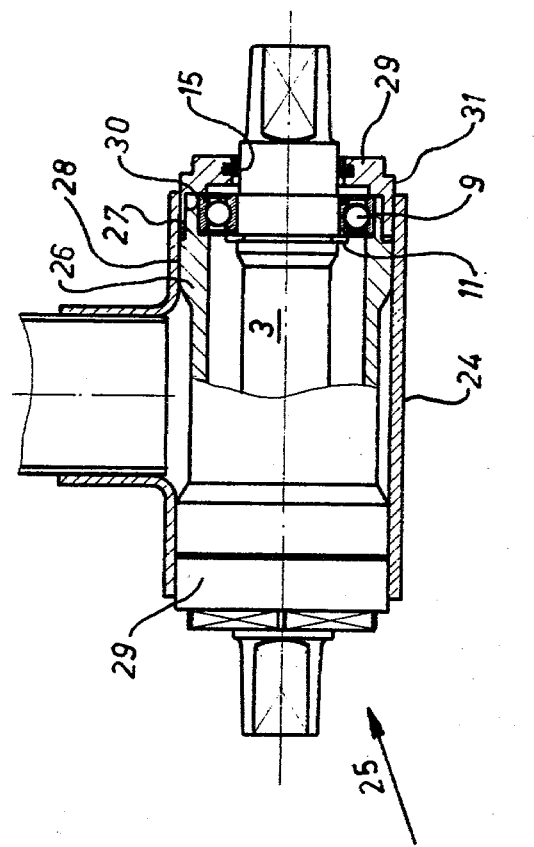

CYCLE CRANK GEAR ASSEMBLY INCLUDING REPLACEABLE CARTRIDGE

BACKGROUND OF THE INVENTION

The present invention relates to cycle pedal crank assemblies.

A cycle pedal crank is known in which an open cylindrical cavity forming a crank gear box in a cycle frame contains internal threads at each end for threaded engagement with external threads on covers. The covers contain outer bearing races on their inner surfaces which cooperate with inner bearing races on a pedal crank axle to contain all bearings therebetween. Inward or outward adjustment of the threaded end covers both position the pedal crank axle and provide for required end play in the ball bearing support thereof.

This arrangement has the disadvantage that the internal threads at the ends of the cylindrical cavity are not always in alignment. This results in relative eccentricity of the inner and outer bearing races at one or both ends of the pedal crank axle thereby causing excessive wear in the bearing races and requiring additional muscular force to operate the cycle.

Furthermore, the conventional pedal crank axle and bearing is not sealed against water and dust. This further adds to excessive wear and requires periodic maintenance for cleaning and regreasing.

Further, manufacturing labor is required for machining and assembly of a pedal crank axle to a bicycle frame and for the proper adjustment of end play.

OBJECTS AND SUMMARY OF THE INVENTION

Accordingly, it is an object of the present invention to provide a bicycle pedal crank which avoids the drawbacks of the prior art.

More particularly, it is an object of the present invention to provide a preadjusted, weather sealed bicycle pedal crank assembly which can be installed in a bicycle frame without adjustment thereof.

A further object of the present invention is to provide a bicycle pedal crank preassembled and preadjusted in a sealed cartridge which is replaceably installable in a bicycle frame.

Accordingly, there is provided a cycle crank gear having a cycle crank gear box and crank gear axle comprising a crank gear housing, means for rotatably mounting the crank gear axle in the crank gear housing and means for securing the crank gear housing in the crank gear box.

According to a feature of the present invention, there is provided a cycle crank gear for a cycle which includes a frame, comprising a crank gear box integrally formed with the frame, the crank gear box including a cylindrical bore therein, an interchangeable cartridge insertable into the cylindrical bore, means for securing the interchangeable cartridge in the cylindrical bore, the interchangeable cartridge including a crank gear axle rotatably disposed therein, at least one end cap in the interchangeable cartridge and forming a part thereof, and rotary seal means between the at least one end cap and the crank gear axle for preventing the entry of foreign matter to the interior of the interchangeable cartridge.

The above, and other objects, features and advantages of the prevent invention will become apparent from the following description read in conjunction with the accompanying drawings in which like reference numerals designate the same elements.

BRIEF DESCRIPTION OF THE DRAWINGS

FIG. 1 is a side elevation of a portion of a bicycle frame containing a crank gear assembly according to an embodiment of the present invention;

FIG. 2 is a partial cross section of a bicycle frame taken along line II—II in FIG. 1;

FIG. 3 is a transverse cross sectional view of a second embodiment of the invention;

FIG. 4 is a transverse cross sectional view of a third embodiment of the invention;

FIG. 5 is a side elevation of a portion of a bicycle frame containing a pedal crank assembly according to a fourth embodiment of the invention; and FIG. 6 is a cross sectional view taken along line VI—VI in FIG. 5.

DETAILED DESCRIPTION OF THE PREFERRED EMBODIMENTS

Referring now to FIG. 1, there is shown a crank gear box 1 affixed by any conventional means, such as by welding, to tubes 2 forming the frame of a cycle. Crank gear box 1 contains a cylindrical bore 8 (FIG. 2). A crank gear housing 4 has a cylindrical outer bearing surface 6 which fits within cylindrical bore 8 of crank gear box 1.

An outer bearing race 12 of a bearing assembly 9 is secured against an abutment shoulder 13 in crank gear housing 4 by a cover 14 which is threaded into crank gear housing 4.

A crank gear axle 13 is axially located within crank gear housing 4 and is supported there by an inner bearing race 10 of bearing assembly. Inner bearing race 10 is axially positioned by a stop 11 on crank gear axle 3. Conventional ball bearings between outer bearing race 12 and inner bearing race 10 provide for low friction rotation of crank gear axle 3.

A gasket seal 15 in the inner perimeter of cover 14 bears against and weather seals crank gear axle 3 and thus prevents the entry of dust, dirt and water into the interior of crank gear housing 4.

The assembly consisting of crank gear housing 4, covers 14 at each end of crank gear housing 4, crank gear axle 3 and bearing assembly 9 constitutes a unitary cartridge 16 which can be factory assembled, lubricated, adjusted and tested and can then be installed as a unit without further adjustment or test. Thus, improved manufacturing efficiency, reduced manufacturing labor costs and reduced maintenance costs are achieved. In addition, due to the greater precision and permanent lubrication that is permitted by use of sealed cartridge 16, improved performance of a cycle employing the present invention is achieved.

After cartridge 16 is inserted into cylindrical bore 8, crank gear box 1 is deformed by a fastening means, such as a bolt 5 which draws together tabs or lugs 17 and 18 to thus secure cartridge 16 in place.

Another method of attachment of cartridge 16 into crank gear box 19 is shown in FIG. 3 wherein a wedge 20 is drawn into frictional engagement with cartridge 16 by conventional means such as a bolt 21.

Simplified assembly is provided by the embodiment of the invention shown in FIG. 4. A set screw or grub screw 23 is threaded through a hole in a crank gear box 22 into holding contact with housing 4 of cartridge 16.

Crank gear housing 4 is preferably drilled with a blind hole to receive set screw 23. This method of assembly eliminates the requirement for tabs 17 and 18 or wedge 20 in order to secure cartridge 16 in place.

The embodiment of the invention shown in FIGS. 5 and 6 simplify both the manufacture of the bicycle frame as well as the installation of the crank gear assembly. A crank gear box 24 requires none of the clamping or wedging devices in the embodiments of FIGS. 1-4. A cartridge 25 made up of a housing 26 has cylindrical bearing surfaces 28 which provide a sliding fit inside crank gear box 24. An annular groove 27 in the end of housing 26 is eccentric with respect to cylindrical outer bearing surface 28 by, for example, 0.2 mm. An end cover 29, which includes a gasket seal bearing against crank gear axle 3 has an inward directed flange 30 which has an outer bearing surface 31 which is coaxial with the axis of crank gear axle 3 and an inner bearing surface which is eccentric with respect to the axis of crank gear axle 3. The eccentricity of the inner bearing surface of inward directed flange 30 is substantially the same as the eccentricity of annular groove 27. Thus, when end cap 29 is rotated with respect to housing 26, a camming action between the two eccentric surfaces locks cartridge 25 in place inside crank gear box 24.

Stop 11 for bearing assembly 9 can be located either on the inside or outside of bearing assembly 9.

It would be clear to one skilled in the art that end cover 29 performs three functions: namely (1) holding bearing assembly 9 in place, (2) holding gasket seal 15 in place and (3) performing the camming action which locks cartridge 25 in place. It would be clear to one skilled in the art that these functions can be performed by separate elements. For example, a cover (not shown) similar to cover 14 in FIG. 2 can be employed to hold bearing assembly in place and a separate end cover 29 can be used to provide cam locking of cartridge 25 in place. Gasket seal 15 may optionally be affixed to either or both covers.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cycle crank gear having a cycle crank gear box and a crank gear axle comprising:
    a crank gear housing;
    means for rotatably mounting said crank gear axle in said crank gear housing; and
    means for securing said crank gear housing in said cycle crank gear box, said means for securing including at least one cylindrical outer surface on said crank gear housing and a cylindrical bore in said cycle crank gear box, said cylindrical outer surface being fittable into said cylindrical bore, and further including eccentric means rotatable on said crank gear housing for camming between said crank gear housing and said cycle crank gear box.

2. A cycle crank gear according to claim 1; wherein said eccentric means includes cover means for covering the ends of said crank gear housing.

3. A cycle crank gear having a cycle crank gear box and a crank gear axle comprising:
    a crank gear housing;
    means for rotatably mounting said crank gear axle in said crank gear housing, said means for rotatably mounting including at least one bearing assembly operative to permit free rotation of said crank gear axle in said crank gear housing, first and second end covers in said crank gear housing operative to position said at least one bearing assembly, and sealing means for isolating said at least one bearing assembly from entry of foreign matter from the exterior thereof; and
    means for securing said crank gear housing in said cycle crank gear box, said means for securing including at least one cylindrical outer surface on said crank gear housing and a cylindrical bore in said cycle crank gear box, said cylindrical outer surface being fittable into said cylindrical bore, and further including eccentric means rotatable on said crank gear housing for camming between said crank gear housing and said cycle crank gear box, wherein said crank gear housing forms at least part of a unitary cartridge which is interchangeably securable in said cycle crank gear box by said means for securing.

4. A cycle crank gear according to claim 3; wherein said eccentric means includes cover means for covering the ends of said crank gear housing.

* * * * *